United States Patent [19]

Kunogi et al.

[11] 3,995,819

[45] Dec. 7, 1976

[54] APPARATUS FOR RECLAIMING AND RECYCLING THERMOSETTING SCRAP

[75] Inventors: Mahito Kunogi, Nagoya; Yosuke Oyama, Obu, both of Japan

[73] Assignee: Kabushiki Kaisha Meiki Seisakusho, Japan

[22] Filed: Nov. 12, 1975

[21] Appl. No.: 631,402

[30] Foreign Application Priority Data

Nov. 15, 1974   Japan .............................. 49-132332

[52] U.S. Cl. .............................. 241/58; 241/101 D; 241/101.4; 241/101.6; 241/154
[51] Int. Cl.² ......................................... B02C 23/34
[58] Field of Search ....... 241/57, 58, 101 B, 101 D, 241/101.4, 101.5, 101.6, 154

[56] References Cited

UNITED STATES PATENTS

| | | | |
|---|---|---|---|
| 2,560,578 | 7/1951 | Keene | 241/101.5 |
| 2,775,174 | 12/1956 | Petrick | 241/154 |
| 3,941,318 | 3/1976 | Ballinger et al. | 241/101.6 |

Primary Examiner—Granville Y. Custer, Jr.
Attorney, Agent, or Firm—Browdy and Neimark

[57] ABSTRACT

Scrap of thermosetting plastics is reclaimed and recycled by an integrally combined apparatus including means for pulverizing scrap into atomized powder and means for mixing and agitating the atomized powder with a virgin material at a desired ratio. An improved recycling apparatus for thermosetting scrap comprises compactly a pulverizer, an atomizer, a mixing device to mix uniformly atomized powder with virgin material, and a purifying device for Noxious gas generated during pulverizing process.

2 Claims, 5 Drawing Figures

3,995,819

APPARATUS FOR RECLAIMING AND RECYCLING THERMOSETTING SCRAP

FIELD OF THE INVENTION

The present invention relates to reclaiming and recycling thermosetting scrap, such as sprue, runner, and other discards, and, more particularly, to an improved apparatus, comprising an integrated grinding-blending machine.

BACKGROUND OF THE INVENTION

It has been well-known to the skilled in the art that injection molded scrap of thermoplastic material can be reclaimed and recycled and that such an apparatus consisting of integrally combined grinding device and a blending device has been developed, because thermoplastic material can easily be remelted and remolded.

Thermosetting material, however, cannot be remelted nor remolded; therefore, thermosetting scrap has been ground and used at best as a filler for virgin material, or as adding material to reduce the resin content of the compound, and has not been positively reused.

Accumulation of unreclaimed thermosetting scrap has been a headache or a serious waste problem for thermosetting material molders on the one hand, but recent research has proved, on the other hand, that pulverized and atomized thermosetting scrap can be effectively used by blending with virgin material up to about 50 percent, without much impairing flexial strength, impact strength and shrinkage properties, etc. of moldings of such scrap blended material.

Under these circumstances, there has been developed, as reported in the November 1974 issue of the magazine "Modern Plastics International" (p. 66), an apparatus of an integral unit for grinding thermosetting scrap and blending the ground and pulverized material with virgin material at a desired ratio. The present invention is an improvement of this apparatus.

SUMMARY OF THE INVENTION

It is an object of the present invention to provide an improved apparatus integrally and compactly comprising a pulverizer, an atomizer, a mixing device, and a purifying means for noxious gases.

It is another object of the present invention to improve the combination of the pulverizer and the atomizer.

It is a further object of the present invention to improve the mixing effect of the mixing device.

It is still a further object of the present invention to exhaust effectively noxious gas generated during the pulverizing process.

It is yet another object of the present invention to provide for the improved provision of thermoset plastic scrap in powder form for reuse.

For a better understanding of the invention a possible embodiment thereof will now be described with reference to the attached drawing, it being understood that this embodiment is intended as merely exemplary and in no way limitative.

DETAILED DESCRIPTION OF THE INVENTION

Figure 1:
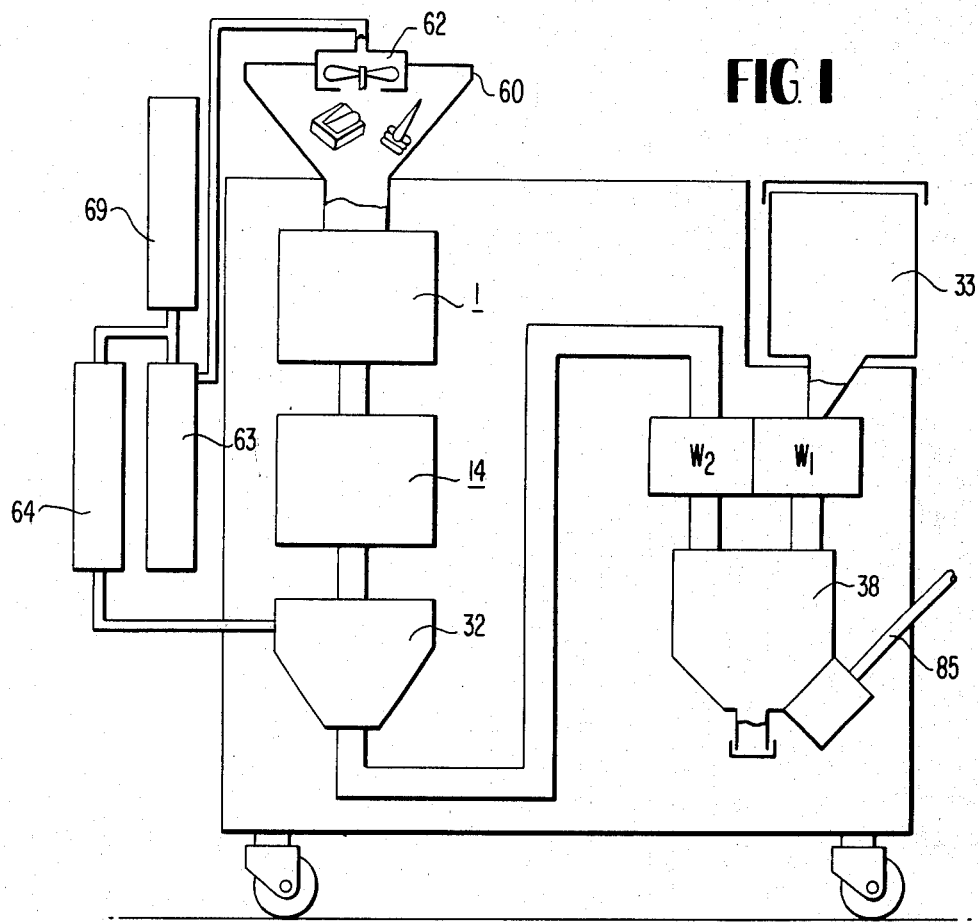
FIG. 1 is a schematic elevational view of the apparatus common to the present invention and the original development.

Now, a preferred embodiment of the present invention will be described hereunder in conjunction with the drawing.

FIG. 1 shows schematically the whole assembly of an embodiment of the present invention. The present invention has improved the originally developed apparatus in various ways, such as how to combine a pulverizer and an atomizer, how to mix uniformly the atomized powder with a virgin material and how to purify exhaust gas including noxious gas and dust.

Figure 3:
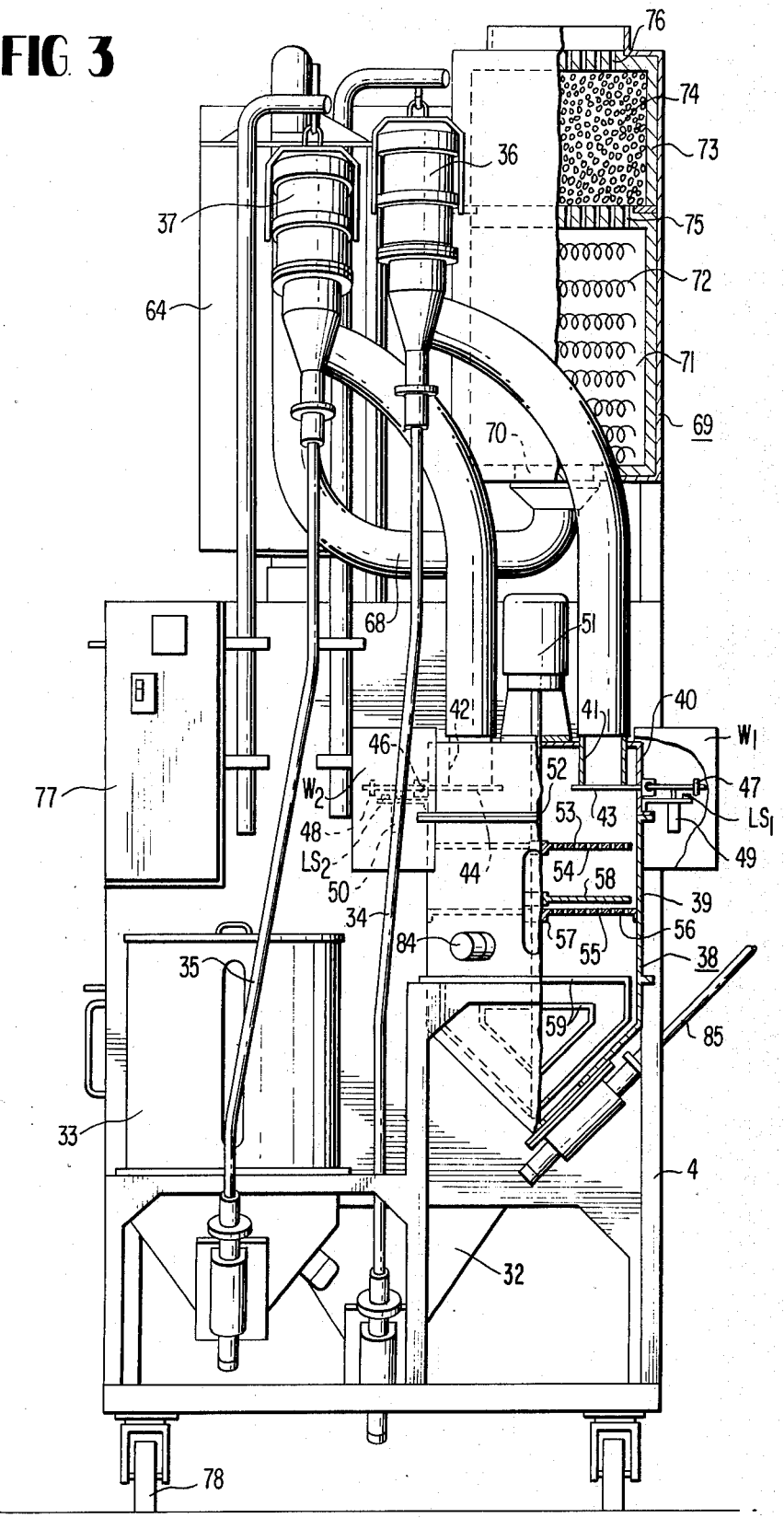
FIG. 3 is a side elevational view, partially broken away, of the device of FIG. 2.
Figure 4:
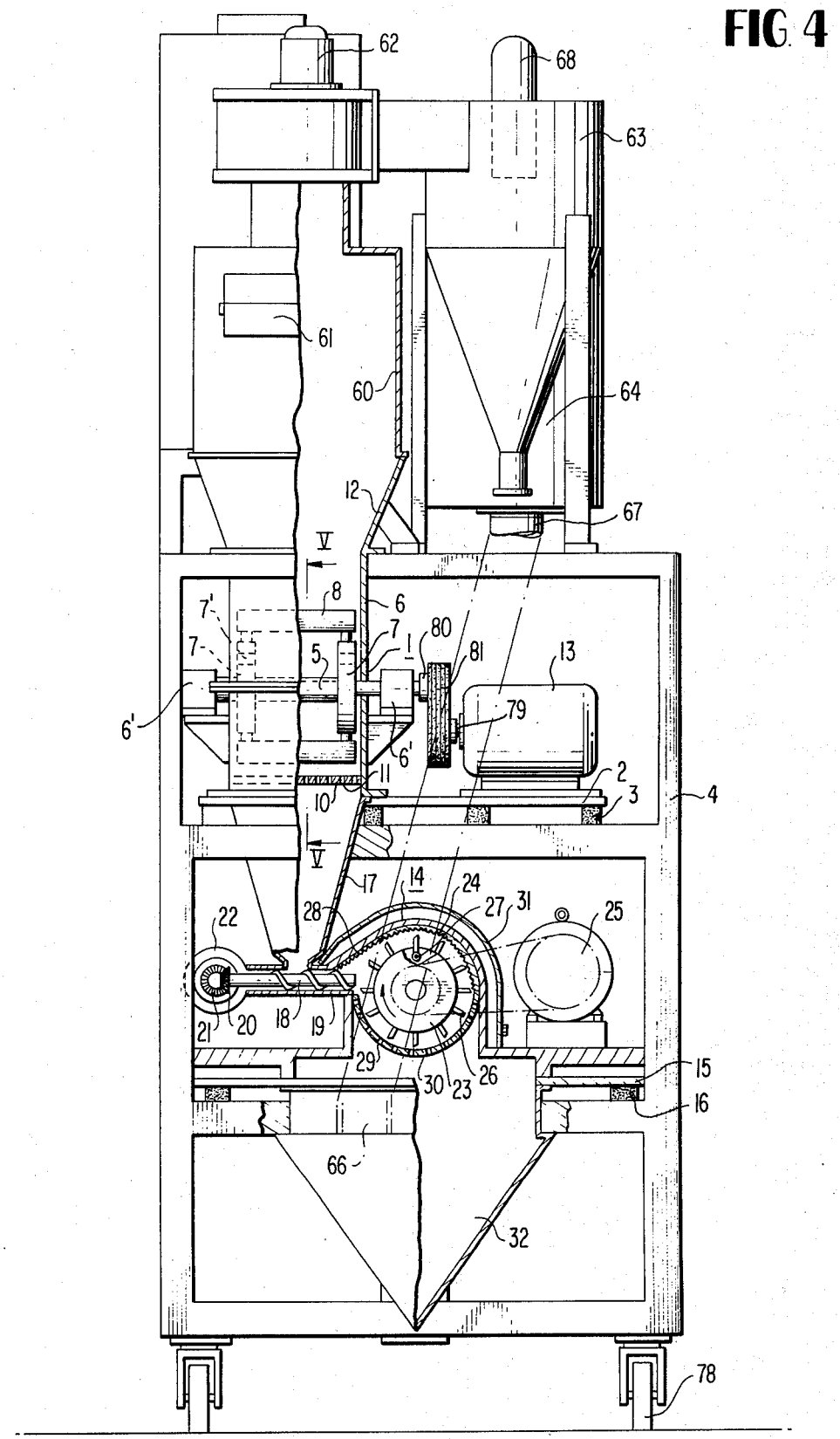
FIG. 4 is another (opposite to FIG. 3) elevational view, partially broken away, of the device of FIG. 2.

Referring to FIGS. 2 – 5, a grinder device 1 is fixedly mounted on a platform 2 which is supported via cushion rubber 3 or the like, by a frame construction 4 of the apparatus. A shaft 5 of the grinder device 1 is rotatably supported by a pair of bearings 6', 6' mounted on a case 6 and is driven by a motor 13 (FIG. 4). A plural number of hammers 8 made of Ni-Cr steel or the like are pivotably connected respectively by pins 7' which are attached to discs 7 fixedly mounted on the shaft 5. A corrugated liner 9 (High Mn, or Ni-Cr steel, etc.) is fixedly attached to the inside of the case 6, and a screen 10 having a plurality of perforations 11 (number and diameter of which are optional, e.g. 5 mm) is fixedly attached at the lower portion of the case 6 underneath the rotatable hammers, both the liner 9 and the screen 10 being confronted to the rotating hammer 8. A hopper 60 is connected with the hopper of the grinder device 1 and is provided with a scrap inlet 61. A throat 12 connects feed hopper 60 and the upper portion of the case 6.

To pulverize more finely the scrap already ground by the grinder 1, there is provided an atomizer 14 fixedly mounted on a platform 15, which is supported via cushion rubber 16 or the like by the frame construction 4. A hopper 17, for storing the ground material, is attached to said grinder device 1, and a screw 18, for transmitting the ground material at a controllable rate from the hopper 17 towards a case 24 of the atomizer 14, is operatively engaged with a feeding cylinder 19 and the screw 18 is rotated by a motor 22 (revolution speed of which may be controlled) through gears 20 and 21. Discs 23 rotatably disposed within the case 24 are driven by a motor 25 (revolution speed of which may be controlled). and smaller hammers 26 (Ni-Cr steel, especially with super hard alloy at a tip) are pivotably connected by pins 27 mounted on the discs 23. A corrugated liner 28 (high Mn, or Ni-Cr steel, etc.) is fixedly attached to the upper inside surface of the case 24, with a clearance of about 0.5 — 1.0 mm being maintained between the liner 28 and hammers 26. A screen 29 provided with a plurality of perforations 30 (number and diameter of perforations are optional, e.g. 30 to 200 mesh) is attached to the lower portion of the case 24. A passage or passages 31 through which a cooling medium circulates are also provided with the case 24. Particle size of the pulverized scrap provided by the grinder device 1 or by the atomizer 14, can be easily controlled from 30 to 200 meshes by changing the screen aperture size.

For storing atomizer powder and virgin material hoppers 32 and 33 are installed respectively and for feeding the atomized powders and the virgin material, there are provided screw conveyors 34 and 35, respectively to be driven by motors 36 and 37, or other suitable powder conveyors. A mixing device 38 comprises a hopper 39 fixedly attached to the frame construction 4, a cover 40 to close the hopper 39, a rotatable disc 53, a stationary screen 55, a rotatable sweeper 58, agitator blades 59 and a motor 51 for driving these rotatable units. A pair of weighting devices W1 and W2 comprise measuring weights 47 and 48, limit switches LS1 and LS2, and pneumatic cylinders 49 and 50, measuring buckets 41 and 42 to store atomized powders and virgin material to a preset amount, respectively, shutters 43 and 44, for opening or closing the measuring buckets 41 and 42, which shutters are pivotably mounted on the cover 40 through pins 45 and 46, so that the buckets 41 and 42 are closed by means of the weights 47 and 48 until the respectively preset amount of powders is stored therein. When the atomized powder or the virgin material supplied in each bucket 41 or 42 overcomes the weight 47 or 48, the limit switch LS1 or LS2 detects the condition from the small movement of the shutter 43 or 44, but the shutters are kept closed by solenoid valve (not shown) operating pneumatic cylinders 40 and 50 until respectively preset amount of powders are stored in both buckets 41 and 42. In actuality, therefore, the operation of the shutters is carried out simultaneously.

A rotatable disc 53 with perforations 54 and a plurality of agitating blades 59 are disposed vertically in the hopper 39 to be rotated by a common shaft 52 driven by a motor 51. The stationary screen 55 with perforations 56 is fixed at the inside of the hopper 39, and the shaft 52 rotatably penetrates the stationary screen 55 at a portion 57 which serves as a bearing. Perforations 54 and 56 have such sizes that the atomized powders and the virgin material can fall freely therethough, respectively. The perforations may be replaced by a plurality of slots at a peripheral portion of the screens. A sweeper plate or bar 58 is fixed to the shaft 52 at a portion just above the stationary screen 55.

Dust and gas which are generated within the grinder device 1 and the hopper 60 are transmitted by a fan 62 to a cyclone type dust collecting device 63, and to a bag filter type dust collecting device 64 including a bag filter 65 therewithin. An opening 66 in the hopper 32 is connected to the bag filter through a hose 67. A hose or a duct 68 connects the dust collecting devices 63 and 64 to a gas purifier 69, as shown in FIG. 1. The gas purifier 69, as shown in FIG. 3, comprises a heating chamber 71 including a heater 72 and reaction chamber 73 including a catalyzer 74. Heated gas in the heating chamber 71 is permitted to enter the reaction chamber 73 through holes 75. An outlet 76 exhausts purified gas from the reaction chamber 73. A control panel 77 is provided to control the function of the whole apparatus, and wheels 78 are to transfer the apparatus.

Operation of the apparatus will be described hereinafter.

Figure 5:
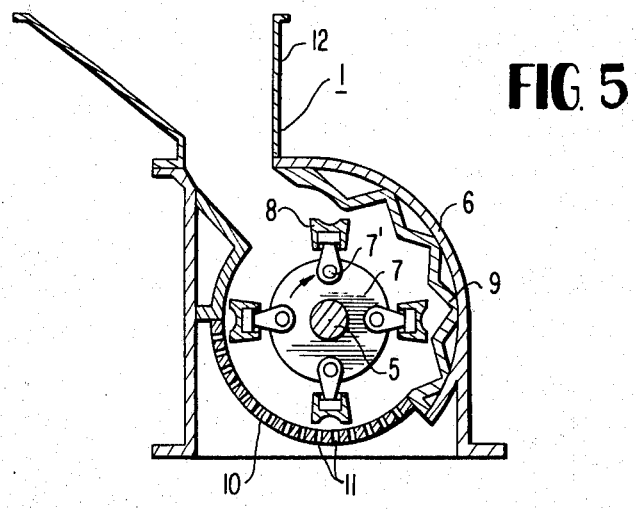
FIG. 5 is a sectional view taken on line V — V of FIG. 4.
Figure 2:
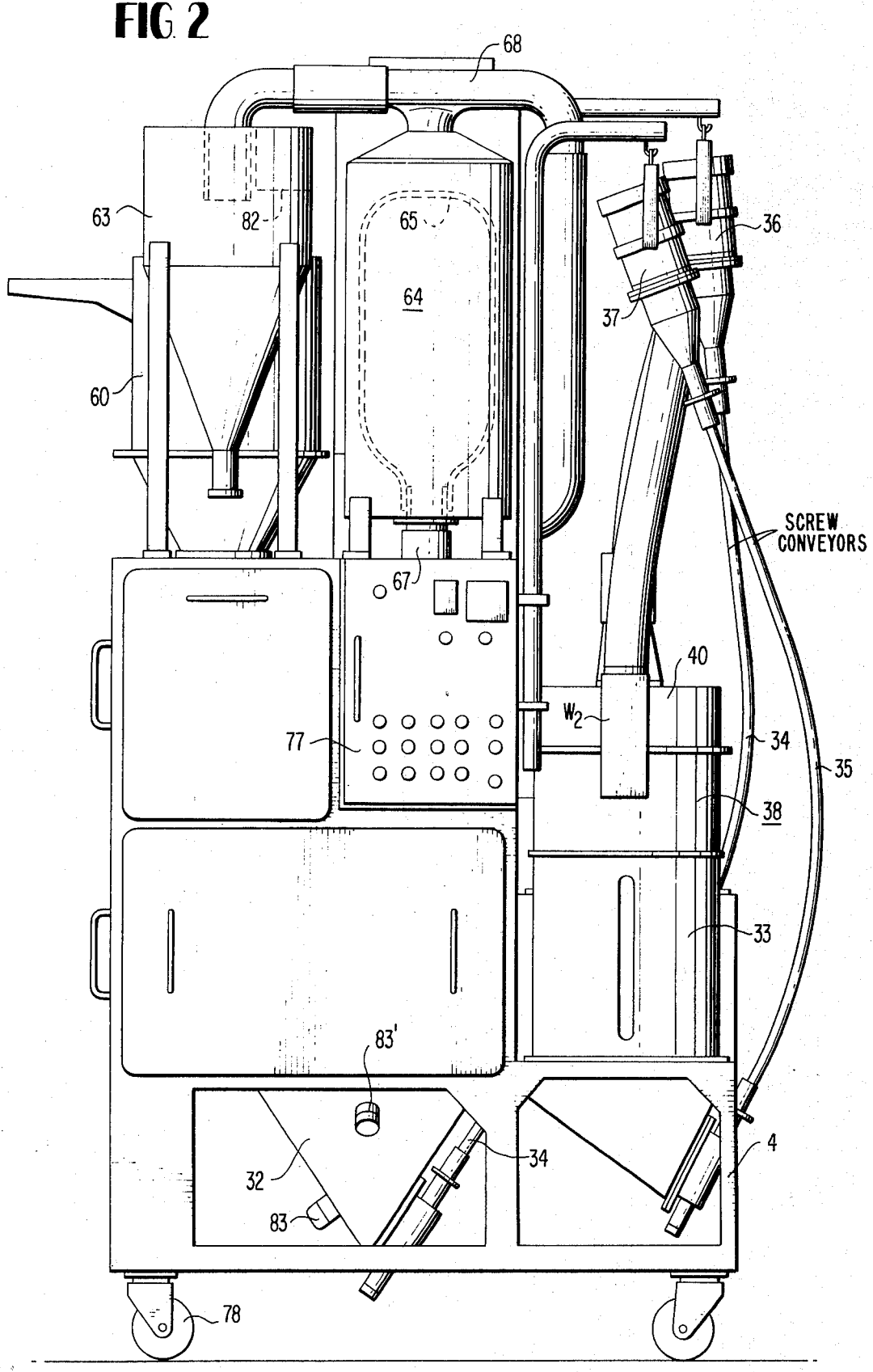
FIG. 2 is a front elevational view of an embodiment of the present invention.

The motor 13 drives the grinder device 1 through pulleys 79, 80 and a drive belt 81 thereon so as to rotate the shaft 5 in the direction indicated by the arrow (revolution speed being 2,000 rpm in the embodiment) in FIG. 5, and thereby the hammers 8 pivotably attached to the discs 7 through pins 7' and 7'' are rotated with the shaft 5 by centrifugal force as shown in FIGS. 4 and 5. Then scrap comprising such as molded sprue, runner and other discards, which scrap is put into the hopper 60 through the scrap inlet 61, is fed from the hopper 60 through the throat 12 of the grinder device 1 into the case 6. The scrap is subjected to smashing impact of the rotating hammers 8 and to collision with the corrugated liner 9 so as to be broken into rough pieces. The scrap is ground into fractions of a size less than the size of the perforations 11 of the screen 10, and thus the ground material the size of which is less than 5 mm in this embodiment falls through the perforations 11 into the hopper 17 of the atomizer 14.

When a level switch (not shown) detects that the ground material of a prescribed amount is stored in the hopper 17, the motor 13 of the grinder device 1 is stopped and at the same time the motor 25 of the atomizer 14 and the motor 22 for the conveyor screw 18 are started in order to drive the discs 23 in a direction indicated by the arrow (revolution speed is 8,000rpm in the embodiment) in FIG. 4, and in order to feed ground scrap to the atomizer 14 at a controllable feeding rate. Thus hammers 26 pivotably attached to the discs 23 through pins 27 are operatively rotated on account of centrifugal force and the screw 18 is rotated through gears 20 and 21, thereby the ground scrap within the hopper 17 is conveyed into the case 24, to be pulverized further by the impact of the rotating hammers 26, by collision with the corrugated liner 28, and by mutual collision of pulverized particles. The atomized powders fall through the perforations 30 of the screen 29 into the hopper 32, so as to store the atomized powders (particle size is from 30 to 200 meshes) to a prescribed amount in the hopper 32. The pulverizing capacity of the embodiment is 50 kg/hr.

Dust and noxious gas such as ammonia or formalin generated in the grinder device 1 and the hopper 60 are exhausted by a fan 62 from an opening 82 into the cyclone type dust collecting device 63 in which dust remains at a lower portion and gas is sent through a hose 68 to an opening 70 of the heating chamber 71 of the gas purifier 69. Dust and noxious gas generated in the hopper 32 are exhausted by air pressure due to operation of the atomizer 14 through a hose 67 into the bag filter 65 in which fine dust is collected. Among the gases sent into the heating chamber 71 through the two hoses 67, 68 as above described, combustible gas is burned by the heater 72 while incombustible gas is sent through holes 75 into the reaction chamber 73 to be purified under action of the catalyzer 74 and then exhausted through the outlet 76.

When a level switch 83 mounted on the hopper 32 detects that the atomized powder of a certain amount is stored in the hopper 32, the motors 22 and 25 are stopped (when another level switch 83' detects that the atomized powder in the hopper decreases to a prescribed level, the motors 22 and 25 are rotated again). The motor 36 and 37 drives the screw conveyor 34 or 35, so as to convey the atomized powder within the hopper 32 or the virgin material within the hopper 33 into the bucket 41 or 42.

When the weight 47 or 48 is balanced by the atomized powder or the virgin material stored in each bucket 41 or 42 and the limit switch LS1 or LS2 detects the balanced state, the motor 36 or 37 stops. But only when both the two limit switches detect the two buckets 41 and 42 to be filled to their respectively prescribed levels, the pneumatic cylinders 49 and 50 operate simultaneously to open the shutters 43 and 44, so that the atomized powder and the virgin material fall at a time onto the rotating disc 53 which is previously driven by the motor 51, in order to achieve more uniform mixing. The two materials, reground and virgin, fall together onto the stationary perforated disc 56 above which a sweeper 58 is rotated by the shaft 52. The screen 55 and the sweeper 58 are desirably provided but not essential to the present invention. The atomized powder and the virgin material which fall from the perforated stationary screen 55 are agitated and mixed by the agitating blades 59 which are rotating underneath the fixed perforated stationary screen 55.

When the pneumatic cylinders 49 and 50 are returned to initial position, the motor 36 and 37 are started again so as to drive the respective conveyor system. When a level switch 84 detects the mixed material of a prescribed amount being stored in the hopper 39, the motor 51 stops.

Mixing ratio of the mixed material can be adjusted by the ratio of the weights 47 and 48 in the weighing devices W1 and W2. The mixed material in the hopper 39 is fed by a conveyor 85 to a hopper of an injection molding machine (not shown) or the like.

As described above, the present invention permits positive reclamation and recycling of thermosetting scrap which has been considered in the prior art difficult to recycle, and provides a compact and self-contained apparatus, which mixes atomized scrap powders with virgin material at a controllable ration and furthermore purifies dust and noxious gas generated during the pulverization process.

It will be obvious to those skilled in the art that various changes may be made without departing from the scope of the invention and the invention is not to be considered limited to what is shown in the drawings and described in the specification.

What is claimed is:

1. An improved apparatus for reclaiming and recycling thermosetting scrap, which integrally and compactly comprises:
    grinding means to provide ground scrap, said grinding means having first rotatable hammers and a perforated screen provided underneath the rotatable hammers;
    an atomizer to provide powdered scrap, said atomizer having second rotatable hammers smaller than said first rotatable hammers for pulverizing said ground scrap further into finer powders and a corrugated liner confronting said hammers;
    a conveyor means for conveying said ground scrap to said atomizer at a controllable rate;
    a pair of measuring means having a pair of buckets provided with a pair of shutters simultaneously openable by balancing of weights which are controllable at a desired ratio therebetween;
    means to feed said powdered scrap from said atomizer to one of said measuring means and means to feed virgin material to the other of said measuring means; and
    a purifying means comprising a heating chamber and a reaction chamber containing catalizer to purify gas generated from said grinding and pulverizing process.

2. An improved apparatus for reclaiming and recycling thermosetting scrap, as claimed in claim 1, wherein at least a perforated disc is rotatably disposed underneath a pair of buckets of said measuring means.

* * * * *